July 21, 1953 P. G. A. NUTZLER 2,646,559
APPROACH DETECTION BY HIGH-FREQUENCY RADIATION
Filed June 6, 1950 2 Sheets-Sheet 1

INVENTOR
Paul Gustav Adolf Nutzler
BY Alexander Powell
ATTORNEYS

July 21, 1953   P. G. A. NUTZLER   2,646,559
APPROACH DETECTION BY HIGH-FREQUENCY RADIATION
Filed June 6, 1950   2 Sheets-Sheet 2
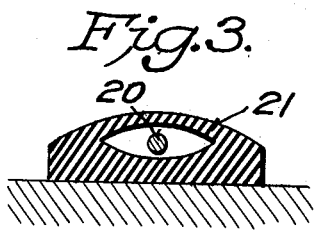
Fig.3.
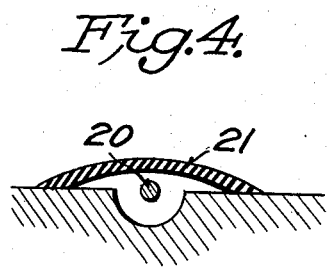
Fig.4.
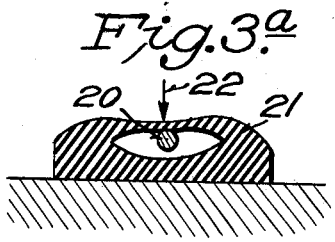
Fig.3ª
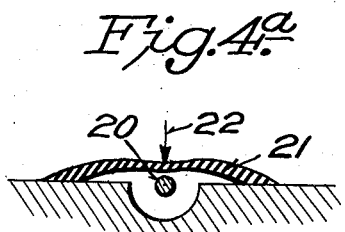
Fig.4ª
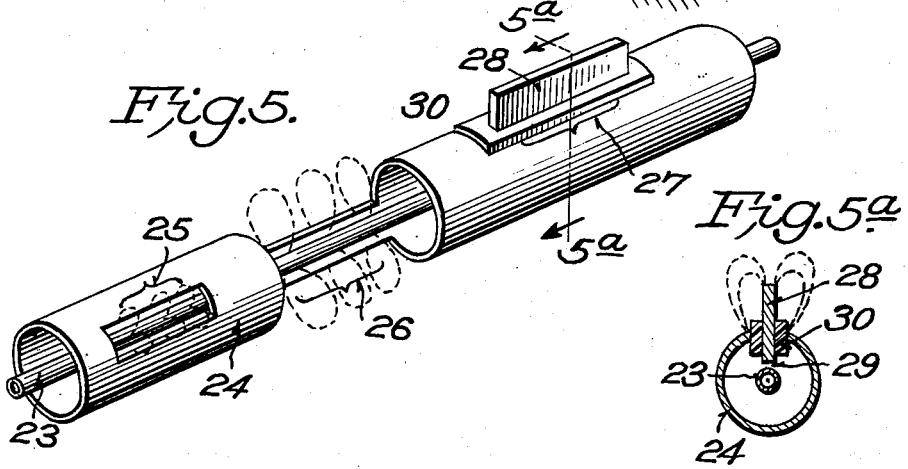
Fig.5.   Fig.5ª
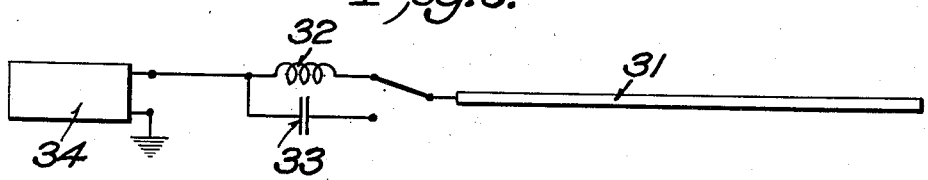
Fig.6.
INVENTOR
Paul Gustav Adolf Nutzler
BY Alexander Powell
ATTORNEYS Patented July 21, 1953

2,646,559

UNITED STATES PATENT OFFICE 2,646,559

APPROACH DETECTION BY HIGH-FREQUENCY RADIATION

Paul Gustav Adolf Nutzler, Sao Paulo, Brazil

Application June 6, 1950, Serial No. 166,468
In Brazil June 9, 1949

4 Claims. (Cl. 340—258)

This invention relates to electronic apparatus for detecting and warning of the approach of a person within a certain place or area.

In the specification and claims such a place or area will be referred to as a "watched place." Considering the practical aim of this invention, it is important to say that the watched places can be either relatively large areas or alternatively very small ones, as for instance a lock, a window-sill, a threshold, a shop-window, a wall, a room, a house or a whole territory.

My invention is based on the fundamental fact that an electromagnetic field of high frequency is disturbed by the introduction thereinto of an intruding mass of dielectric constant greater than 1, such as the mass of a person or an animal. This electromagnetic field of high frequency (the watching field) is produced by a generator (watching generator), the frequency of which is influenced and altered by the intrusion of a person therewithin. If the frequency of the watching generator is heterodyned with the frequency of a control generator the frequency of which does not change under the influence of such intrusions, there will result a differential beat frequency, the frequency of which depends on the degree of disturbance of the watching field. If the watching field is not disturbed, the frequencies of the watching generator and the control generator must have the same value, so that there is no differential frequency. If then a person enters the watching field of a watched place, the frequency of the watching generator will be shifted and this alteration will appear as a differential frequency causing either a sound to be emitted from a loudspeaker or causing the release of a signal of some other type.

As a practical matter it is very difficult to maintain two oscillators in synchronism with a differential frequency equal to zero, not only because of the fluctuations in the electrical constants of the two oscillator circuits but also because of fluctuations of the plate voltage supply and "heater voltage" supply. For this reason, the invention provides that the electrical constants of the oscillator circuits of the generators and the thermal constants thereof must be equal in their values as nearly as possible. Furthermore, the differential frequency can more easily be maintained at zero by maintaining constant the plate voltage and, if necessary, the heater current, too.

A primary object of my invention is the application of the so-called "pulling-in" effect: i. e. two generators of almost the same frequency tend to synchronize with respect to frequency if there exists a certain amount of electric coupling therebetween. In the construction of most heterodyne generators it is necessary to avoid the "pulling-in" effect as much as possible. My invention, however, takes advantage of this effect in the following way. The watching generator and the control generator are constructed in such a way that they are "electrically decoupled"; and then an adjustable "pull-in"-coupling is provided by a variable element such as an adjustable condenser which permits the range of the "pulling-in" to be adjusted according to practical necessities. By altering the degree of the electric coupling, the watching generator can absorb small fluctuations without falling out of synchronism with the control generator. This pull-in effect reduces the need for precision manufacture of both generators.

The application of the "pulling-in" effect to this invention brings additional advantages. The adjustable "pull-in"-coupling offers not only the most simple means to regulate the effective sensitivity of the watching fields but also provides an important advantage in that it creates a threshold of sensitivity such that weak disturbances of the watching field will be insufficient to cause actuation of the alarm circuit. A further advantage stems from the fact that when a sufficiently strong disturbance occurs, a very distinct beat note is at once created. In other words, either a disturbance of the watching field causes no warning signal at all, or else it causes a very definite signal when the threshold of the pull-in range is exceeded. Expensive filter-circuits can, therefore, be avoided, since it is not necessary for the alarm circuit to discriminate between small frequency differentials and larger differentials.

The alarm circuits of the invention require no special consideration. A sufficient disturbance of the watching field causes a differential frequency having a determinable value of voltage this value being sufficient to set off a signal. However it is necessary to take into consideration the duration time of a probable disturbance of the watching field. For example, in a watched passage, the disturbing intrusion can pass with great rapidity, causing a very short disturbance of the watching field, while at a closed door or window, which might be a "difficult passage," a person would probably cause a much longer disturbance of the watching field. There are well known devices which can detect very short disturbances, even if the time duration thereof is only a few microseconds, an example of such device being a thyratron. On the other hand, it is desirable to avoid the detection of excessively short disturbances in order to obviate the likelihood that an atmospheric discharge might release the signal. A reaction time of about $5 \times 10^{-3}$ seconds will satisfy the exigencies of practice.

Another important object of my invention is to provide a means for watching various places which means is versatile enough to permit the electromagnetic watching field to be intensified in localities which require a close watch to be maintained, and to be weakened in localities where a sensitive field is neither needed nor desired.

Another object of my invention is to provide a system to which additional watched places may be added from time to time, such additions being economically and easily added, and the whole system being capable of central control.

Still another object of my invention is to provide a system which may be unobtrusively installed so that an intruder will not be forewarned of its presence.

Other objects and advantages of my invention will become apparent during the following discussion of the drawings, wherein:

Fig. 3 represents schematically a cross section of a dielectric covered cable; Fig. 3a showing the cable pinched at the arrow to alter its electrical characteristics, and cause a disturbance of its field.

Fig. 4 is a view similar to Fig. 3 but showing a wire having a flexible member thereover; Fig. 4a showing the member distorted toward the wire to disturb its electric characteristics.

Fig. 5 shows a coaxial cable having portions on the outer conductor cut away to propagate a watching field in selected locations.

Fig. 5a is a section view along line 5a—5a of Fig. 5.

Fig. 6 is a schematic diagram showing my system attached to a conductor of such wave length that standing waves are produced along the length thereof, the location of the nodes being movable by introducing capacity or inductance between the oscillator and the conductor.

Figure 1:
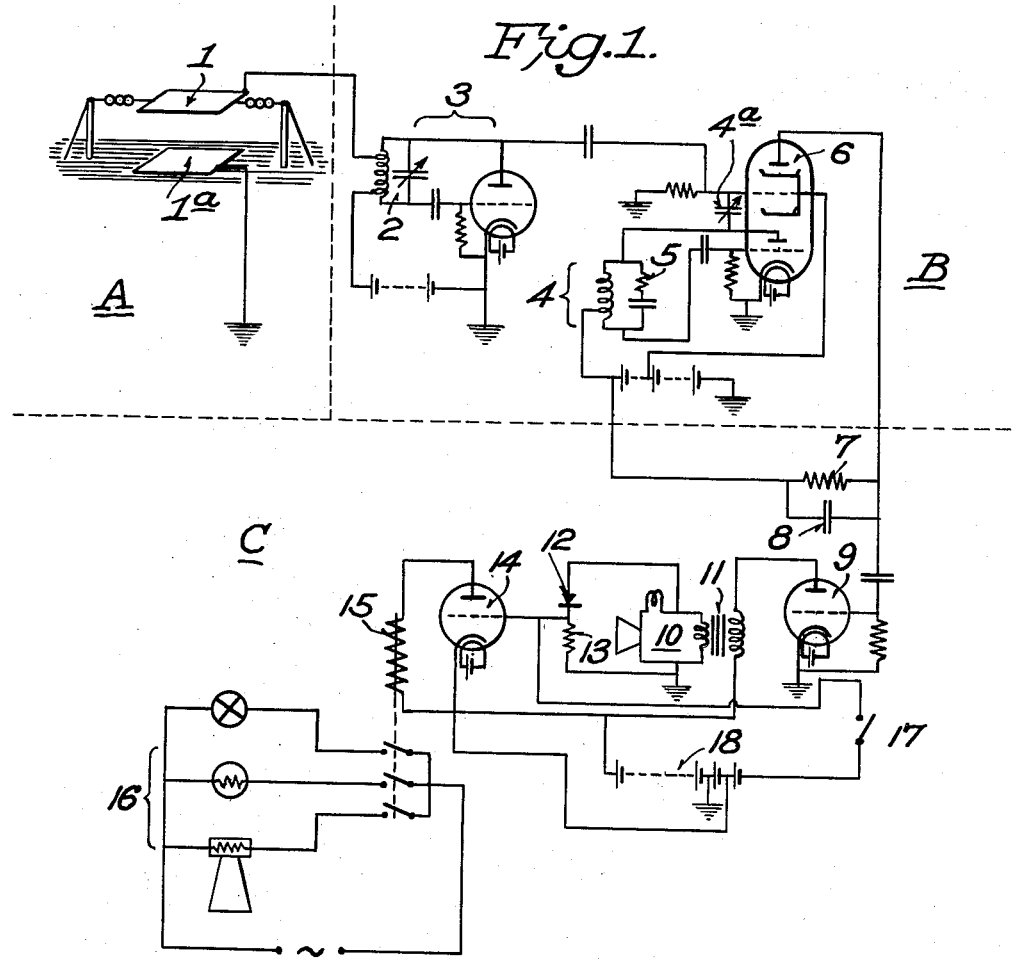
Fig. 1 is a schematic diagram of one practical circuit which might be used in carrying out my invention.

For the sake of clearness, Fig. 1 represents the circuit of the system divided into three sections according to the function of each. Section A represents the watched place and the field propagating means therein, section B represents the oscillators and the heterodyne mixer, and section C the alarm device. In the practical circuit illustrated in Fig. 1, the watched place may be a passage, in which it is possible to give the watching field the form of a condenser of large dimensions. The upper plate 1 of this condenser is spaced from the lower ground plate 1a.

Practical experiments have shown that satisfactory results may be obtained where the separation of the plates is as much as 6 to 12 feet. Where the generators have a frequency of about 1500 kc., they give a differential frequency of about 1 kc., if the watching field is disturbed by a person walking between the plates 1 and 1a. The second condenser plate 1a is not always necessary, but it improves the efficiency by 50% or so.

Practical conditions will dictate the best coupling to be used in connecting the watching condenser 1 to the oscillatory circuit 2 of the watching generator 3.

The heterodyne part B comprises the watching generator 3 and the control generator 4 with a mixer portion 6. As stated above the electrical constants of both the generators should be equal.

The two oscillators 3 and 4 both feed into the same grid of the mixer 6 and are coupled together by a variable condenser which controls the above mentioned pull-in effect. The resistance 5 which is in series with the condenser in the oscillatory circuit of the control generator 4 is approximately equal to the value of the radiation resistance of the passage condenser 1, 1a.

It should be pointed out that the number of tubes used in the heterodyne part and the manner of connection thereof does not represent any limitation to the invention, other connections being obviously possible.

The alarm portion C operates on the beat note of the two high frequencies of the generators 3 and 4 as supplied by the mixer tube 6. The resistance 7 and the by-pass condenser 8 form the beginning of this section. The product of the resistance 7 and the by-pass condenser 8 gives us a time constant which should have a value of about $5 \times 10^{-3}$ seconds, in order to prevent the setting off of the alarm device by a disturbance of short duration. The circuit of Figure 1 represents a circuit in which the disturbance of the watched field creates a beat note audible in a loudspeaker. For this purpose it is necessary to use a power amplifier tube 9 and a loudspeaker 10. The beat note current is taken from the secondary side of an output transformer 11 and passed through a resistance 13 and through a rectifier 12. The voltage which results across the resistance 13 causes the ignition of the thyratron tube 14 which in turn closes the relay 15. This relay switches on signaling devices summarily marked 16, which may include such devices as a search light, an electric bell, an electric horn, etc. After the ignition of the thyratron, the latter may be extinguished by pressing the key 17 which connects the battery 18 to the grid thereof to bias it beyond cut-off.

The circuit shown in Fig. 1 operates in the following way: Presuming that the passage is not disturbed by the presence of a person, the frequencies of the watching generator 3 and the control generator 4 will have the same value. The "pull-in" coupling, adjustable by changing the capacity of the coupling condenser 4a, normally causes the two oscillators to synchronize and provides a threshold below which a spurious disturbance will not cause a beat note. However, if an intruder comes into the operating range of the watching field, there will result an alteration in the frequency of the watching generator 3. If the "pull-in" range is small, disturbances of small intensity will cause a differential sound; but if the coupling condenser 4a is adjusted to increase the pull-in range, a greater disturbance will be required to set off the alarm. In the later case the operation of the circuit becomes less sensitive.

Whenever there is a disturbance of the watching field which exceeds the pull-in range, there will result across the parallel condenser 8 and resistance 7 a signal which is amplified by the tube 9 and impressed across the loudspeaker 10 through the output transformer 11. The loudspeaker will cause to be heard an audible sound and the thyratron 14 will be ignited by the voltage across the resistance 13, closing the relay 15 and energizing the signaling devices 16. Due to the fact that the thyratron 14 remains ignited after it is started, the relay 15 and signaling devices 16 will remain in constant operation until the key 17 is depressed to extinguish the thyratron. If, in a watching installation only an audible signal is desired, parts 12 through 18 may be omitted.

Figure 2:
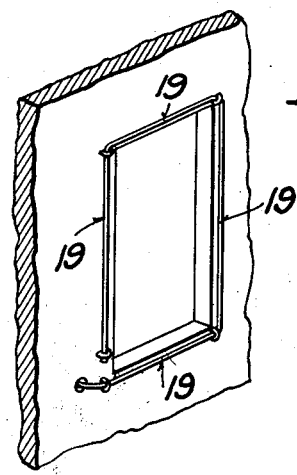
Fig. 2 is a view of a window opening showing a wire secured around the sill, the wire propagating a watching field in the vicinity of the window.

Experiments show the practicality of installations having propagation means which do not prejudice the architectural and aesthetic value of a house. Figure 2 represents, for instance, the window of a house with a propagator 19 installed at a distance of 1 to 2 inches from an aperture in a wall, said propagator conducting the high frequency current of the watching generator and producing thereby a satisfactory watching field. If a person approaches this conductor within a distance of two or three feet, the alteration of the frequency of the watching generator will be sufficient to sound an alarm. Propagators of this type offer the advantage that they may be installed in a simple and unobtrusive way in houses which are to be watched.

By mounting the conductor of high frequency near to a wall, there is obtained still another effect, i. e., the touching of the wall some distance away from the conductor will provoke such an alteration of the frequency of the watching generator that the alarm is set off. This effect amplifies the possibilities in the practical application of the invention. At first a proximate mounting of the conductor to the wall of a watched house appeared of little value for theoretical and technical reasons, but experiments showed that both the proximity effect and the touching effect can be utilized in different watched places of one installation, according to convenience and necessity.

If the electric length of the propagating conductor approximates the wave-length of the watching generator there will result standing waves along the conductor which then resembles an unterminated transmission line. There will be peaks and nodes therealong and it will of course be apparent that the watching field in the vicinity of the nodes will be insensitive, whereas it will become more sensitive in the vicinity of a peak. The peaks along the transmission line should be disposed in the watched places, and the nodes should be disposed in those places where persons are to pass without setting off an alarm. The electric length of a conductor 31 can be altered by using inductances 32 and/or capacities 33, as shown in Fig. 6, these inductances and capacities being inserted between the watching oscillator 34 and the conductor 31. Only a very simple circuit is shown in Fig. 6, but it is to be understood that more complex L-C networks may be used if needed to shift the nodes and peaks as desired.

Still another type of propagator may be used, the field of which is altered by physical pressure. The conductor of high frequency 20 is covered with an elastic dielectric 21, for instance vulcanized rubber or vinylite, as shown in Fig. 3; or one side of the conductor 20 may be disposed adjacent to an elastic dielectric member 21, as shown in Fig. 4. As soon as sufficient pressure 22 alters the shape of the elastic dielectric 21 and, thereby, the field of the conductor, as shown in Figs. 3a and 4a, the field of the conductor 20 will be disturbed, thereby changing the frequency of the watching generator.

It appears from the above discussion that there are three characteristic types of propagators for producing watching fields in practice: propagators affected by the approach of a body thereto; propagators affected by a physical touching thereof; and propagators affected by a physical distortion thereof by pressure thereon. By means of these propagators, which can be applied to and combined in one installation, the invention provides means for constructing efficient watching installations applicable to all practical situations.

It remains to be mentioned that coaxial cables which are used in high frequency work, are to be understood as within the scope of this invention. The coaxial cable is of special importance in the practical application of the invention, because it is an ideal form of conductor for convenient propagation of space fields and surface fields just where they are wanted.

Fig. 5 shows the application of a coaxial cable according to the idea of this invention. 23 is the inner conductor of high frequency current surrounded by the outer conductor 24. As shown at 25, conductor 24 has an incision of a certain length. At this incision will be radiated a space field of restricted dimensions, whereas at 26, the space field will be substantially a maximum, this maximum being obtained by cutting a larger incision in the outer conductor 24. At 27, there is only a small incision, and the conductor 24 is supported in the incision by means of an insulator 30 (cross section, Figure 5a). The result is a space field adjacent the incisions and no field adjacent the intervening portions of the outer conductor.

My invention also contemplates the production of watching fields by coupling the generator to additional metal ornaments and/or varnishes containing metal particles.

Some of the applications of the invention will include watching over safes of banking firms, store-houses and magazines, special rooms, cases or chests, shop-windows, etc. Devices can be constructed which release a signal when a person enters a shop or a room, or which function to count persons who visit expositions or other meetings.

I do not limit my invention to the exact forms shown in the drawings for obviously changes may be made within the scope of the claims.

I claim:

1. A device for warning of an intrusion of a body into a "watched place," comprising propagating means for setting up a field of radio frequency in said watched place; an oscillator for generating said radio frequency, the frequency having a normal value which becomes altered from said normal by intrusion of said body within the field; a control oscillator providing a fixed control-frequency equal to said normal value; adjustable coupling means between said oscillators providing an adjustable pull-in effect which maintains said first frequency normally locked-in with respect to said control-frequency and provides an adjustable threshold below which minor disturbances of said field will be insufficient to alter said first frequency; means to detect a beat-frequency between said frequencies; and alarm means adapted to be set off by the presence of said beat-frequency.

2. A device for warning of an intrusion of a body into selected locations in a "watched place," comprising propagating means for setting up a field of radio frequency in said watched place, the intensity of the field being greater in selected locations and lesser in non-selected locations; an oscillator for generating said radio frequency, the frequency having a normal value which becomes altered from said normal by intrusion of said body within the field; a control oscillator providing a fixed control-frequency equal to said normal value; adjustable coupling means between said oscillators providing an adjustable pull-in effect which maintains said first frequency normally locked-in with respect to said control-frequency and provides an adjustable threshold below which minor disturbances of said field will be insufficient to alter said first frequency; means to detect a beat-frequency between said frequencies; and alarm means adapted to be set off by the presence of said beat-frequency.

3. In a device as set forth in claim 2, said propagating means comprising an unterminated transmission line approximating one wave length in length and having standing waves thereon providing nodes and peaks in said field, and adjustable inductors and capacitors in said transmission line whereby the peaks may be placed in the selected locations and the nodes placed in the non-selected locations.

4. In a device as set forth in claim 2, said propagating means comprising a coaxial transmission line having an inner and an outer conductor; and said outer conductor having incisions therethrough at the selected locations whereby said field may propagate into the selected locations in operative intensity, the shape of the incision controlling the shape of the field.

PAUL GUSTAV ADOLF NUTZLER.

References Cited in the file of this patent

UNITED STATES PATENTS

| Number | Name | Date |
|---|---|---|
| 1,584,613 | Comstock | May 11, 1926 |
| 2,112,826 | Cook | Apr. 5, 1938 |
| 2,188,873 | Bonner | Feb. 6, 1940 |
| 2,206,923 | Southworth | July 9, 1940 |
| 2,247,246 | Lindsay | June 24, 1941 |
| 2,386,942 | Edelman | Oct. 16, 1945 |
| 2,421,771 | Browning | June 10, 1947 |
| 2,554,124 | Salmont | May 22, 1951 |

FOREIGN PATENTS

| Number | Country | Date |
|---|---|---|
| 499,203 | Germany | June 4, 1930 |
| 707,648 | France | Apr. 20, 1931 |